United States Patent
Van Dijk et al.

(10) Patent No.: US 9,250,470 B2
(45) Date of Patent: Feb. 2, 2016

(54) ILLUMINATION SYSTEM WITH REMOTE PHOSPHOR LAYER AND/OR SCATTERING LAYER

(75) Inventors: Gerardus Arnoldus Rita Van Dijk, Eindhoven (NL); Andreas Martinus Theodorus Paulus Van Der Putten, Eindhoven (NL); Rene Theodorus Wegh, Eindhoven (NL); Martinus Petrus Joseph Peeters, Eindhoven (NL); René Jan Hendriks, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1012 days.

(21) Appl. No.: 13/146,135

(22) PCT Filed: Jan. 21, 2010

(86) PCT No.: PCT/IB2010/050264
§ 371 (c)(1),
(2), (4) Date: Oct. 4, 2011

(87) PCT Pub. No.: WO2010/086766
PCT Pub. Date: Aug. 5, 2010

(65) Prior Publication Data
US 2012/0020051 A1    Jan. 26, 2012

(30) Foreign Application Priority Data
Jan. 28, 2009  (EP) ..................................... 09151518

(51) Int. Cl.
*G02F 1/1335*    (2006.01)
(52) U.S. Cl.
CPC .... *G02F 1/133603* (2013.01); *G02F 1/133606* (2013.01); *G02F 1/133611* (2013.01)

(58) Field of Classification Search
CPC ................... G02F 1/133603; G02F 1/133606; G02F 1/133611
USPC .......................................................... 362/84
See application file for complete search history.

(56) References Cited

U.S. PATENT DOCUMENTS

| 6,642,652 B2 | 11/2003 | Collins, III et al. |
| 7,193,248 B2 | 3/2007 | Weindorf et al. |

(Continued)

FOREIGN PATENT DOCUMENTS

| EP | 1521235 A2 | 4/2005 |
| JP | 2003347601 A | 12/2003 |

(Continued)

OTHER PUBLICATIONS

Shoustikov et al., "Electroluminescence color tuning by dye doping in organic light-emitting diodes", Selected Topics in Quantum Electronics,1998, pp. 3-13, vol. 4, Issue 1.

*Primary Examiner* — Mary McManmon

(57) ABSTRACT

The invention relates to an illumination system (10, 12), to a remote phosphor layer (30; 32, 34), to a scattering layer (32), to a luminaire (100), to a display device (300) and to a method of at least partially correcting a light emission characteristic of at least one light source (22) in the illumination system. The illumination system comprises an array of light sources (20) and a remote phosphor layer and/or a scattering layer arranged between the array of light sources and a light output window (40) for emitting the light from the light sources. At least one light source of the array of light sources comprises a light emission characteristic different from the other light sources of the array of light sources. The luminescent material (52, 54) is distributed across the remote phosphor layer and/or the scattering structures (52) and/or scattering material (52) are distributed across the scattering layer for compensating at least partially the difference in light emission characteristic of the at least one light source.
The effect of the illumination system according to the invention is that the deviation of the at least one light source can be compensated, and as such, binning of light sources may be omitted.

15 Claims, 3 Drawing Sheets

(56) References Cited

U.S. PATENT DOCUMENTS

| | | | |
|---|---|---|---|
| 7,250,715 B2 | 7/2007 | Mueller et al. | |
| 7,380,962 B2 * | 6/2008 | Chaves et al. | 362/293 |
| 7,387,891 B2 | 6/2008 | Boege et al. | |
| 7,984,999 B2 * | 7/2011 | Harbers et al. | 362/231 |
| 2003/0207645 A1 | 11/2003 | George et al. | |
| 2004/0217383 A1 | 11/2004 | Krames et al. | |
| 2005/0001535 A1 | 1/2005 | Suzuki et al. | |
| 2005/0104076 A1 | 5/2005 | Mueller-Mach et al. | |
| 2005/0231105 A1 | 10/2005 | Lovell et al. | |
| 2005/0261122 A1 | 11/2005 | Quesada Perez et al. | |
| 2006/0268537 A1 | 11/2006 | Kurihara et al. | |
| 2007/0096131 A1 | 5/2007 | Chandra | |
| 2008/0218993 A1 | 9/2008 | Li | |
| 2008/0231162 A1 | 9/2008 | Kurihara et al. | |
| 2009/0323304 A1 * | 12/2009 | Helbing | 362/84 |

FOREIGN PATENT DOCUMENTS

| | | |
|---|---|---|
| JP | 2005115372 A | 4/2005 |
| JP | 2007060573 A | 3/2007 |
| JP | 2007133173 A | 5/2007 |
| JP | 2007524206 A | 8/2007 |
| JP | 2007273887 A | 10/2007 |
| JP | 2008186777 A | 8/2008 |
| WO | 0169692 A1 | 9/2001 |
| WO | 2005083037 A1 | 9/2005 |
| WO | 2007007236 A2 | 1/2007 |
| WO | 2007060573 A1 | 5/2007 |
| WO | 2008104936 A2 | 9/2008 |
| WO | 2009107052 A1 | 9/2009 |
| WO | 2010086766 A1 | 8/2010 |

* cited by examiner

ILLUMINATION SYSTEM WITH REMOTE PHOSPHOR LAYER AND/OR SCATTERING LAYER

FIELD OF THE INVENTION

The invention relates to an illumination system comprising a plurality of light emitting sources and a remote phosphor layer and/or a scattering layer.

The invention also relates to a luminaire comprising the illumination system, to a display device comprising the illumination system and to a method of correcting a light emission characteristic of at least one light source in an illumination system.

BACKGROUND OF THE INVENTION

Illumination systems comprising a plurality of light sources and a remote phosphor arrangement are known per se. They are used, inter alia, in a luminaire for general lighting purposes, for example, for office lighting, for shop lighting or, for example, for in-home general lighting purposes. These illumination systems are also used in backlighting systems and display devices comprising backlighting systems.

A remote phosphor arrangement comprises luminescent material which absorbs part of the light emitted by a light source of the array of light sources and converts the absorbed light into light of a different color. When the luminescent material is arranged at a distance from the light source or light sources, a so called remote phosphor arrangement is obtained. Benefits when using the remote phosphor configuration are well known and include that the conversion efficiency and the life-time of the luminescent material are improved and that the range of luminescent materials to choose from is improved.

Such an illumination system is, for example, known from the patent application US 2006/0268537 in which a phosphor film that has a fluorescent characteristic is disclosed. In a specific embodiment of this US application a phosphor film is disclosed which is arranged remote from three light sources which are arranged in parallel. The phosphor material is arranged in areas in which the concentration of phosphor particles increased with a distance from the center of the light source. In general a phosphor has higher wavelength conversion efficiency and a larger number of converted light components as the irradiation light increases. Therefore, by increasing the concentration of the phosphor in a portion father away from the luminance center of the light source, a uniform color distribution can be generated.

A disadvantage of the known illumination system is that the uniformity of the illumination system may still be insufficient.

SUMMARY OF THE INVENTION

It is an object of the invention to further improve the uniformity of the illumination system.

According to a first aspect of the invention the object is achieved with an illumination system. According to a second aspect of the invention, the object is achieved with a remote phosphor layer. According to a third aspect of the invention, the object is achieved with a scattering layer. According to a fourth aspect of the invention, the object is achieved with a luminaire. According to a fifth aspect of the invention the object is achieved with a display device. According to a sixth aspect of the invention the object is achieved with a method of correcting a light emission characteristic of at least one light source in an illumination system.

The illumination system according to the first aspect of the invention comprises an array of light sources and a remote phosphor layer and/or a scattering layer arranged between the array of light sources and a light output window for emitting the light from the light sources, at least one light source of the array of light sources comprising a light emission characteristic different from the other light sources of the array of light sources, the remote phosphor layer and/or scattering layer being arranged at a distance from the array of light sources, the remote phosphor layer comprising luminescent material arranged for converting at least a part of the light emitted by the light sources into light of a different color, the scattering layer comprising scattering structures and/or scattering material arranged for scattering at least a part of the light emitted by the light sources, the luminescent material being distributed across the remote phosphor layer and the scattering structures and/or scattering material being distributed across the scattering layer for compensating at least partially the difference in light emission characteristic of the at least one light source.

Light emission characteristic comprises, for example, a color of the light emitted or may comprise a spatial color variation of the light source and which may be different for the at least one light source compared to the remainder of the light sources of the illumination system. The light emission characteristic may also, for example, comprise an emission intensity or spatial intensity variation around the light source and which may be different for the at least one light source compared to the remainder of the light sources of the illumination system.

The effect of the illumination system according to the invention is that the specific distribution of the luminescent material across the remote phosphor layer and/or the scattering structures and/or scattering material across the scattering layer is used to compensate differences in emission characteristic of the at least one light source compared to the remainder of the light sources. This compensation results in a benefit that any binning of light sources may be omitted and that the uniformity of the light emitted by the light output window of the illumination system may be improved. When an array of light sources is used, for example, an array of light emitting diodes, the individual light sources typically have varying light emission characteristics. Often, these variations occur due to production variations in the production process of the individual light sources. To improve the uniformity in light emitting diode arrays, often binning is applied. In such arrangement, the emission characteristic of the light emitting diodes is determined and only light emitting diodes that have substantially identical emission characteristics are combined in a single array. Although binning provides relatively good uniformity of the light emitted from an array of light sources, the binning process is relatively costly and requires good logistics. In the illumination system according to the invention, the illumination system comprises, next to the array of light sources, also a remote phosphor layer comprising luminescent material and/or a scattering layer comprising scattering structures and/or scattering material. By adapting the distribution of the luminescent material across the remote phosphor layer and/or of the scattering structures and/or scattering material across the scattering layer, the emission variations due to varying emission characteristics of at least one light source in the array of light sources can at least partially be compensated, thus generating a relatively high uniformity of the light emitted from the light output window of the illumination system while omitting the need for binning.

In the known illumination system of US 2006/0268537 an array of three light sources are combined with a phosphor film. The concentration of the phosphor particles in the phosphor film varies such that the concentration of the phosphor particles increases in a portion further away from the light source. The concentration variation pattern in the known illumination system is identical for every light source in the array of light sources and the concentration variation pattern is centered on an optical axis of the light source of the known illumination system. Although the cited variation of the concentration may enable a relatively uniform emission of light, still uniformity variations remain due to variations in the emission characteristic of the light sources. Still binning seems to be required to improve the uniformity of the emission of light from the known illumination system. Even worse: now the binning not only includes color and/or intensity variations of the light sources which should match within the array, but also the angular light emission variation both in intensity and color should match for every light source. Especially, due to the predefined concentration variation pattern provided in the known phosphor film, any deviation from the expected angular light emission variation of the light source in the known illumination system would cause relatively large uniformity variations which remain present in the known illumination system. So not only the intensity and/or color of the light sources in the array of the known illumination system of US 2006/0268537 should match, but the angular light emission variation of the individual light sources should match the expected angular light emission variation used to design the predefined concentration variation. So by applying the predetermined concentration variation in the phosphor film as shown in the known illumination system of US 2006/0268537, the binning process for generating a uniform light emission distribution becomes much more difficult as the requirements to the light sources such that they would match become more stringent, and thus becomes more expensive. Furthermore, the used phosphor film is relatively expensive to produce as the phosphor particles may not simply be applied evenly across the phosphor film.

In the illumination system according to the invention, the remote phosphor layer and/or the scattering layer are arranged for at least partially compensating the difference in emission characteristic. The remote phosphor layer comprises luminescent material arranged for converting at least a part of the light emitted by the light sources into light of a different color. The distribution of the luminescent material across the remote phosphor layer is generated to at least partially compensate the difference in light emission characteristic of the at least one light source. The scattering layer comprises scattering structures and/or scattering material arranged for scattering at least part of the light emitted by the light source. The distribution of the scattering structures and/or scattering material across the scattering layer is generated to at least partially compensate the difference in light emission characteristic of the at least one light source. The remote phosphor layer and/or the scattering layer according to the invention are optimized for a specific array of light sources and are typically different for every array of light sources and typically also depend on the sequence of the light sources in the array of light sources. So, although the cost for producing the remote phosphor layer and/or scattering layer according to the invention may be comparable to the cost to produce the known phosphor film of US 2006/0268537, however now, due to the remote phosphor layer and/or scattering layer according to the invention no binning or otherwise selection of light sources is required—making the total system cost lower—while the resulting uniformity of the light emitted from the illumination system is much better as the distribution of the luminescent material and/or scattering structures and/or scattering layer is tailored to the current array of light sources.

In an embodiment of the illumination system, the light emission characteristic comprises any of: light intensity, light color, angular emission profile. Variations in these light emission characteristics generally cause uniformity variations in an illumination system.

In an embodiment of the illumination system, the distribution of the luminescent material comprises local variations of the luminescent material for at least partially compensating the difference in light emission characteristic, and/or wherein the distribution of the scattering structures and/or scattering material comprises local variations for at least partially compensating the difference in light emission characteristic, the local variations comprising varying a density of the luminescent material across the remote phosphor layer, and/or varying a density of the scattering structures and/or scattering material across the scattering layer. The variation of the density of the luminescent material may be sufficient to compensate any variation in the light emission characteristics of the at least one light source, for example, when the light sources emit substantially blue light. In such an embodiment the luminescent material is arranged for absorbing part of the emitted blue light and converting the absorbed blue light to, for example, yellow light which produces substantially white light when mixed with the remainder of the blue light from the light source. Such an illumination system emits substantially white light in which an angular variation of the intensity and/or color of the emitted blue light may be compensated by varying the density of the luminescent material across the remote phosphor layer. Alternatively or additionally a scattering layer may be present in which the density of the scattering structures and/or scattering material varies across the scattering layer to alter the emitted intensity locally. The local variations may comprise varying a thickness of the luminescent material across the remote phosphor layer, and/or varying a thickness of the scattering structures and/or scattering material across the scattering layer. Again, in the previous example, having a substantially uniform luminescent material, a thickness variation may be used to compensate for any variation in the emission characteristics of the at least one light source. Alternatively or additionally a scattering layer may be present in which the thickness of the scattering structures and/or scattering material varies to alter the emitted intensity locally. The local variations may also comprise varying a mixture of different phosphor materials and/or scattering material in the luminescent material across the remote phosphor layer.

The luminescent material may be used to generate a required color of light, for example, white light having a specific color temperature. The scattering structures and/or scattering material may be used to locally alter the intensity of the emitted light. In such an embodiment, the mixture of luminescent material and/or scattering structures and/or scattering material must be adapted to ensure that the emitted light across the light output window comprises the required specific color temperature and intensity distribution. Altering a density of the scattering structures and/or scattering material cause an local altering the emission characteristic. The local variations of the luminescent material may comprise varying scattering and/or reflection properties across the remote phosphor layer for altering a length of an optical path through the remote phosphor layer. By locally adapting the optical path through the remote phosphor layer, the extent of the light conversion can be adapted, thus locally altering the emission characteristic.

In an embodiment of the illumination system, a combination of the array of light sources and the remote phosphor layer and/or scattering layer is configured for generating a substantially uniform light distribution across the light output window. As indicated before, generally the remote phosphor layer and/or scattering layer designed for compensating the emission characteristic of at least one light source in the array of light sources are specific for that particular array of light sources and typically cannot be used for a different array of light sources while generating good uniformity. As such, the combination of the array of light sources and the remote phosphor layer and/or scattering layer is chosen to generate the substantially uniform light distribution.

In an embodiment of the illumination system, the remote phosphor layer and/or the scattering layer are movable inside the illumination system for optimizing the uniformity of the light distribution across the light output window. By having the remote phosphor layer and/or scattering layer movable inside the illumination system, any inaccuracies in the production of the distribution of the luminescent material and/or scattering structures and/or scattering material may be compensated for. Also the positioning of the remote phosphor layer and/or scattering layer with respect to the array of light sources may be compensated for. For example, when increasing the distance between the light output window and the remote phosphor layer and/or scattering layer, any remaining non-uniformities in the light emitted by the remote phosphor layer and/or scattering layer may be averaged out via mixing of light before the light is emitted via the light output window. When the illumination system is, for example, used in a backlighting unit, the number of light sources in the array of light sources may be relatively large. Here, the lateral positioning of the remote phosphor layer and/or scattering layer may be critical and thus by moving the remote phosphor layer and/or scattering layer in lateral direction substantially parallel to the array of light sources, an optimization of the uniformity can be achieved.

In an embodiment of the illumination system, the illumination system comprises a plurality of remote phosphor layers, each arranged between the array of light sources and the light output window, each remote phosphor layer comprising a specific luminescent material for absorbing a specific part of the light emitted by the light sources and emitting light of a specific color. The luminescent material may, for example, comprise three different phosphor materials, a first emitting substantially red light, a second emitting substantially green light and a third emitting substantially blue light. By adapting, for example, a thickness of each of the three phosphor materials individually, local color variations may be corrected.

In an embodiment of the illumination system, the plurality of remote phosphor layers are applied on a single carrier material. Such an arrangement would simplify the manufacturing of the illumination system, since, after the generation of the plurality of remote phosphor layers on the single carrier material, the single carrier material only needs to be positioned inside the illumination system such that the combination of the array of light sources and the plurality of phosphor layers generate a relatively high uniformity across the light output window. Furthermore, the scattering layer may also be combined on or integrated within the single carrier material to further simplify the manufacturing of the illumination system.

In an embodiment of the illumination system, the luminescent material is a printable luminescent material for generating the distribution across the remote phosphor layer via a printing process, and/or wherein the scattering material is a printable scattering material for generating the distribution across the scattering layer via the printing process. A benefit of this embodiment is that it simplifies the production of the distribution of the luminescent material across the remote phosphor layer and of the scattering material across the scattering layer. Any printing process will do. In production, the array of light sources may be attached to the illumination system while the remote phosphor layer and/or scattering layer are not present in the illumination system. Measuring the uniformity at the light output window of the illumination system enables to calculate the density, thickness and/or specific mixture of luminescent material and/or scattering material locally required. This calculated information may be converted to data which may be used by a printing device to print the required distribution of luminescent material and/or scattering material. For the conversion of the measured color and intensity variation into the required local variation of luminescent material and/or scattering material, for example, look-up tables may be used or algorithms, loops, modeling, etc. The determination of the required distribution of the luminescent material and/or scattering material may be improved by measuring the uniformity of the illumination system incorporating the array of light sources with a reference remote phosphor layer or reference scattering layer with spatial constant composition, and determining the spatial deviation which requires correction.

In an embodiment of the illumination system, the array of light sources comprises an array of light emitting diodes. In the context of this patent application, light source may include, next to the light emitting element, also secondary optics, such as lenses and diffusers. These secondary optics may cause the light emission characteristic to the different which may be compensated for by a correct distribution of the luminescent material and/or scattering structures and/or scattering material.

In an embodiment of the illumination system, the light sources in the array of light sources emit light having a central wavelength in a range between 400 nanometers and 490 nanometers. Light having a central wavelength in a range between 400 and 490 nanometers is also known as blue light. A benefit when using blue light as light emitted by the array of light sources is that this light is visible to humans and thus can directly be mixed into the output of the illumination system without conversion. Any conversion using luminescent materials to convert light from one color to another introduces some loss of energy due to a Stokes-shift involved in the conversion. Using light sources emitting blue light reduces the need to convert all light from the light sources which increases the efficiency of the illumination system. Furthermore, the color blue is one of the primary colors which may be used to mix with other primary colors such as red and green or such as yellow to obtain white light. For example, when the luminescent material absorbs part of the blue light emitted by the light source and emit yellow light, and when the amount of luminescent material is chosen properly so as to convert part of the blue light and transmit the remainder of the blue light, the light emitted from the illumination system basically may, for example, be the color white (due to the combination of remainder of the blue light and yellow light emitted by the further luminescent material). A further benefit when using light sources emitting blue light is that the use of ultraviolet light in the illumination system is omitted while still being able to produce substantially any color of light.

Often, ultraviolet light is used in phosphor converted light sources as many phosphor materials absorb ultraviolet light and convert this absorbed ultraviolet light into visible light. However, ultraviolet light may be harmful to humans and should not be emitted by the illumination system. As such, ultraviolet filters, blocking any remaining ultraviolet light from being emitted from the illumination system may be required when the light sources emit ultraviolet light and can be omitted when the light sources emit blue light. Furthermore, ultraviolet light may react with other materials in the illumination system, such as plastics, and may damage these other materials.

In this context, light of a specific color or specific wavelength typically comprises light having a predefined spectrum. The predefined spectrum may, for example, comprise a primary color having a specific bandwidth around the specific wavelength, or may, for example, comprise a plurality of primary colors. Light of a primary color, for example, includes Red, Green, Blue, Yellow, Amber, and Magenta light. Light of the specific color may also comprise mixtures of primary colors, such as Blue and Amber, or Blue, Yellow and Red. By choosing, for example, a specific combination of the Red, Green and Blue light substantially every color can be generated by the illumination system, including white. Also other combinations of primary colors may be used in the illumination system which enables the generation of substantially every color, for example, Red, Green, Blue, Cyan and Yellow. The number of primary colors used in the illumination system may vary.

The method of at least partially correcting a light emission characteristic of at least one light source in the illumination system according to the sixth aspect of the invention comprises the steps of:

determining a variation of the emission characteristic across the light output window of the illumination system before applying the remote phosphor layer and/or a scattering layer, determining a distribution of the luminescent material and/or scattering structures and/or scattering material required for compensating the difference in light emission characteristic of the at least one light source, applying the luminescent material according to the determined distribution for generating the remote phosphor layer for compensating at least partially the difference in light emission characteristic, and/or applying the scattering structures and/or scattering material according to the determined distribution for generating the scattering layer for compensating at least partially the difference in light emission characteristic, and applying the remote phosphor layer and/or the scattering layer to the illumination system.

BRIEF DESCRIPTION OF THE DRAWINGS

These and other aspects of the invention are apparent from and will be elucidated with reference to the embodiments described hereinafter.

In the drawings.

The figures are purely diagrammatic and not drawn to scale. Particularly for clarity, some dimensions are exaggerated strongly. Similar components in the figures are denoted by the same reference numerals as much as possible.

DETAILED DESCRIPTION OF EMBODIMENTS

Figure 1A:
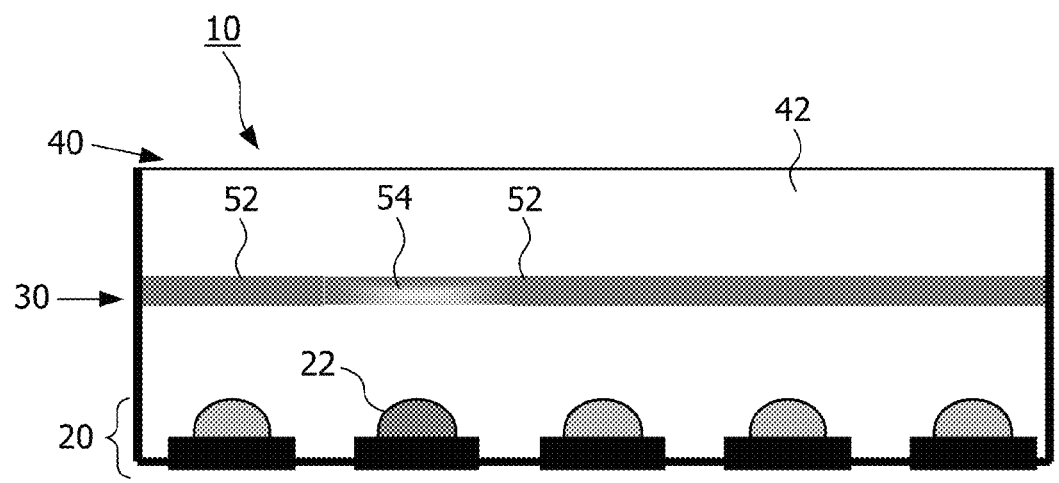
FIGS. 1A, 1B, and 1C show schematic cross-sectional views and a top view of an illumination system according to the invention.
Figure 1B:
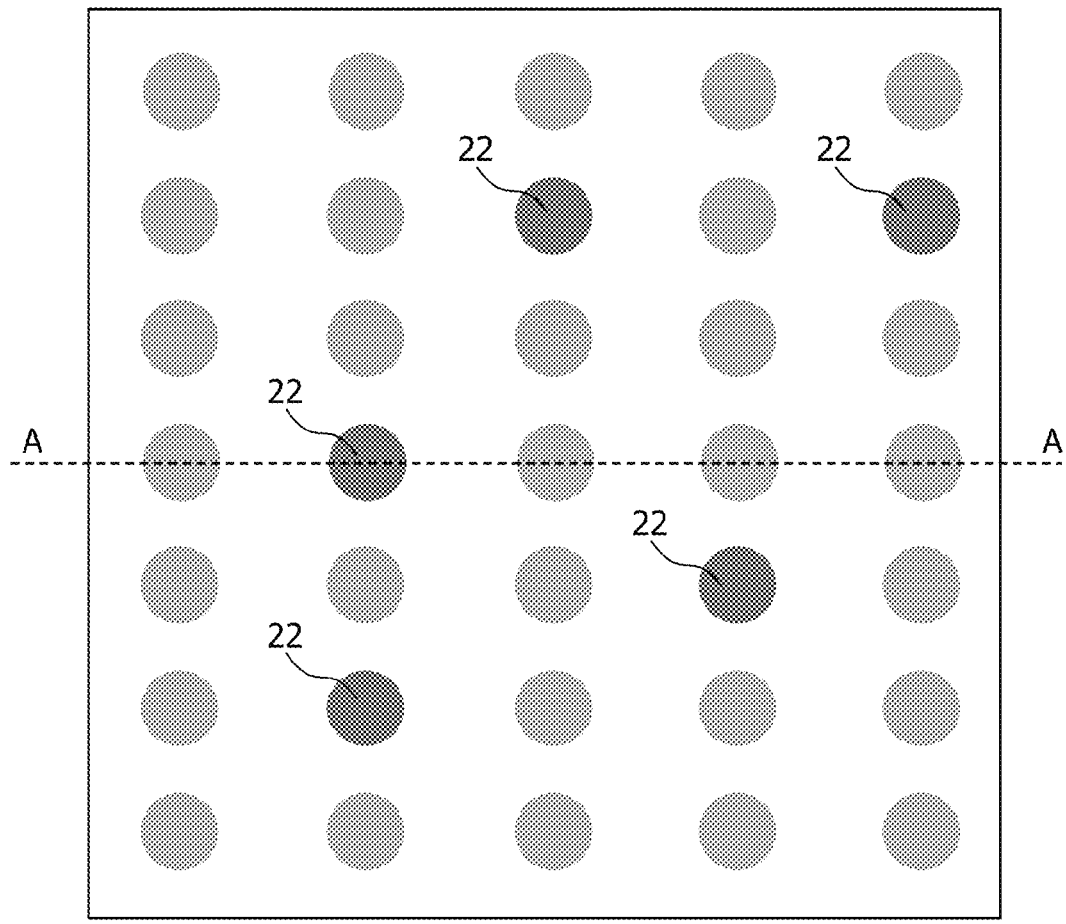
Figure 1C:
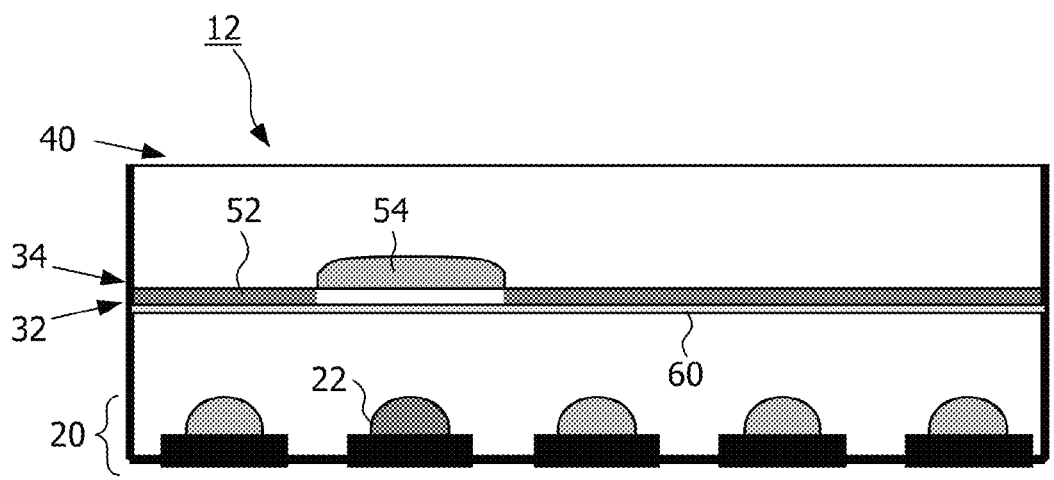

FIGS. 1A, 1B, and 1C show schematic cross-sectional views and a top view of an illumination system 10, 12 according to the invention. The illumination system 10, 12 comprises an array of light sources 20 and a remote phosphor layer 30; 32, 34 and/or scattering layer 32 which is arranged between the array of light sources 20 and a light output window 40. The light emitted by the illumination system 10, 12 is emitted via the light output window 40. At least one light source 22 of the array of light sources 20 comprises a light emission characteristic different from the other light sources of the array of light sources 20. This different light emission characteristic may result in the at least one light source 22 to have lower intensity compared to the other light sources of the array 20, or which may result in a different angular light distribution emitted by the at least one light source 22. The different light emission characteristic may also include differences with respect to the color of light emitted by the at least one light source 22, for example, the central wavelength of the spectrum emitted by the at least one light source is shifted with respect to the other light sources of the array 20, or the spectral contribution of the light emitted by the at least one light source 22 differs compared to the spectral contribution of the light emitted by the other light sources in the array 20. This difference in light emission characteristics typically results in a non-uniform illumination of the light output window 40. This non-uniformity may, for example, be a color non-uniformity when the color of the light emitted by the at least one light source 22 deviates from the other light sources in the array 20, or may, for example, be an intensity non-uniformity when the intensity and/or the angular distribution of the light emitted by the at least one light source 22 deviates from the intensity and/or angular distribution of the light emitted by the other light sources of the array 20.

The remote phosphor layer 30; 32, 34 is generally arranged at a distance from the array of light sources 20 to obtain a remote phosphor arrangement. The remote phosphor layer 30; 32, 34 comprises luminescent material 52, 54 which converts at least a part of the light emitted by the light sources 20, 22 into light of a different color. The luminescent material 52, 54 is distributed across the remote phosphor layer 30; 32, 34. The distribution of the luminescent material 52, 54 is chosen such that differences in light emission characteristic of the at least one light source 22 is at least partially compensated.

Alternatively and/or additionally a scattering layer 32 may be arranged between the array of light sources 20 and the light output window 40. In the current examples, only the layer indicated with reference number 32 is indicated as a layer comprising scattering structures 52 and/or scattering material 52 and as such functions as a scattering layer 32. However, also other layers indicated with reference numbers 30 and 34 may represent scattering layers or may comprises scattering structures 52 and/or scattering material 52. Also mixtures of luminescent materials 52, 54 and scattering material 52 may be present in several or a single of the layers indicated in the following embodiments. Scattering structures 52 may be any structures present on a layer which scatter light, for example, scratches, indentations, dots etc. Scattering material 52 represents material which may be dispersed in a carrier material which often is transparent material and which is able to scatter impinging light. The carrier material may, for example, next to scattering material 52 also comprise luminescent materials 54 dispersed in the carrier material and as such generate a combined remote phosphor and scattering layer. The scattering structures 52 and/or scattering material 52 are distributed across the scattering layer 32. The distribution of the scattering structures 52 and/or scattering material 52 is chosen such that differences in light emission characteristic of the at least one light source 22 is at least partially compensated.

To compensate the difference in light emission characteristic, the density of the luminescent material 52, 54 across the remote phosphor layer 30; 32, 34 and/or of the scattering structures and/or scattering material across the scattering layer 32 may be varied. Alternatively, the thickness of the luminescent material 52, 54 across the remote phosphor layer 30; 32, 34 and/or of the scattering structures and/or scattering material across the scattering layer 32 may be varied to compensate the difference in light emission characteristic. Varying the thickness of luminescent material 52, 54 and/or scattering material 52 may be done by having a luminescent material 52, 54 and/or scattering material 52 which may be deposited or printed in small quantities, for example, using laser-printing or ink-jet-printing processes. When, for example, the intensity or color distribution at the light output window 40 is measured while the remote phosphor layer 30; 32, 34 and/or scattering layer 32 are not present, the variation due to the at least one light source 22 in the array of light sources 20 is measured. From these measurements and from the available luminescent materials 52, 54 and/or scattering materials 52 one can determine what variation is required of the luminescent material 52, 54 and/or scattering material 52 on the remote phosphor layer 30; 32, 34 and/or the scattering layer 32 to compensate at least partially for this different light emission characteristic of the at least one light source 22 in the array 20. This determination of the required variation may be done using absorption, excitation and emission spectra of the available luminescent materials 52, 54 or may be done using look-up tables indicating which variation improves the uniformity and what the effect of this variation is. Alternatively, the mixture of different phosphor materials in the luminescent material 52, 54 may be varied across the remote phosphor layer 30; 32, 34. Often luminescent materials 52, 54 comprise a mixture of different phosphor materials, each specific phosphor material absorbing a specific part of the light emitted by the light sources 20 and emitting light of a specific color. By adapting the mixture, local variations due to changes in light emission characteristics of the light source can thus be compensated, at least partially.

A printing system may, for example, comprise three different print-sources for printing three different luminescent materials 52, 54 to compensate for, for example, Red, Green and Blue variations. The printing system may also comprise a fourth print-source providing scattering material 52 for adapting the density of scattering material 52 across the scattering layer 32 to compensate for intensity variations. Printing all four printing sources on a single substrate 60 may generate a single substrate comprising both luminescent materials 52, 54 and scattering materials 52. Alternatively, scattering structures 52 may be pre-printed via on the substrate 60, for example, via local laser ablation of the surface of the substrate 60, while subsequently the luminescent materials 52, 54 are applied.

FIG. 1A shows a schematic cross-sectional view along the line AA as shown in FIG. 1B. The illumination system 10 shown in FIG. 1A comprises the remote phosphor layer 30 arranged at a distance from the array of light sources 20 and arranged between the array of light sources 20 and the light output window 40. In this cross section, one of the light sources 22 has a different light emission characteristic compared to the other light sources in the array 20, which is indicated with a different grey-shade. As indicated before, the difference in the light emission characteristic may be color, angular color distribution, intensity and angular intensity distribution which all are indicated schematically in FIG. 1A with the different grey-shade. The illumination system 10 typically comprises a light mixing chamber 42 in which the remote phosphor layer 30 may be movable (not shown), for example, in a direction perpendicular to the light output window 40. Moving the remote phosphor layer 30 away from the light output window 40 may enhance the uniformity at the light output window 40 as the light emitted from the remote phosphor layer 30 is mixed in the part of the light mixing chamber 42 between the remote phosphor layer 30 and the light output window 40. Alternatively, the remote phosphor layer 30 may be movable in a direction parallel to the remote phosphor layer 30 to, for example, correct any misalignment due to manufacturing tolerances of the illumination system 10.

Alternatively, as indicated earlier, the layer indicated with reference number 30 may also comprise scattering material 52 (not shown) or may be a scattering layer 30.

FIG. 1B shows a schematic top-view of the illumination system 10 when the remote phosphor layer 30 has been removed. In this configuration, the variation of light intensity and/or color at the light output window 40 may be measured which may be used to determine which variation of the luminescent material 52, 54 and/or scattering structures 52 and/or scattering material 52 is required for at least partially compensating the difference in light emission characteristic of the at least one light source 22. In the embodiment shown in FIG. 1B five light sources 22 are present having a different light emission characteristic compared to the remainder of the light sources 20. In the schematic arrangement shown in FIG. 1B all deviating light sources 22 are indicated with the same grey-shade. However, the individual light emission characteristic of these deviating light sources 22 may be different from each other in any aspect of the light emission characteristic.

After having measured the uniformity at the light output window 40 of the current array of light sources 20, the remote phosphor layer 30 may be generated (see FIG. 2), for example, printed using well known printing techniques such as laser-printing, ink-jet-printing or any other printing technique. Alternatively or additionally the scattering layer 32 may be generated or scattering material 52 may be added to the remote phosphor layer 30. For this reason, the measured differences should be converted into digital information usable for a printer (not shown) or usable for the chosen printing technique. Furthermore, the phosphor suspension and/or suspension of scattering material 52 should be made with an appropriate viscosity, particle size and stability adapted to the chosen printing technique. The remote phosphor layer 30 may also be generated, for example, be extrusion (not shown) of phosphor-containing plastic material into a plate with adjustable thickness—preferably locally.

FIG. 1C shows a schematic cross-sectional view of an alternative embodiment of the illumination system 12 according to the invention. Again the array of light sources 20 is present with the at least one light source 22 having a light emission characteristic which deviates from the remainder of the light sources in the array 20. Again the remote phosphor layer 32, 34 is arranged between the array of light sources 20 and the light output window 40. Now, the remote phosphor layer is constituted of different luminescent materials 52, 54 which are applied to a carrier material 60 in separate layers 32, 34 of luminescent material 52, 54. These discrete layers 32, 34 may be directly applied on top of each other as shown in the schematic representation of FIG. 1C, or may, alternatively, be applied on individual carrier materials (not shown) which each may even, for example, be individually movable in the illumination system 12. As can be seen in FIG. 1C the thickness of the luminescent material 52, 54 may, for example, be adapted and may even be arranged to vary within a single layer of luminescent material 32, 33 to at least partially compensate the difference between the light emission characteristics of the different light sources 20.

Alternatively and/or additionally the layer having reference number 32 may be a scattering layer 32 which comprises scattering structures 52 and/or scattering material 52. In combination with the luminescent layer 54 a compensation in both color and intensity may be obtained. As mentioned before, the luminescent layer 34 may also comprise scattering material 52 and the scattering layer 32 may also comprise luminescent material 54.

Figure 2:
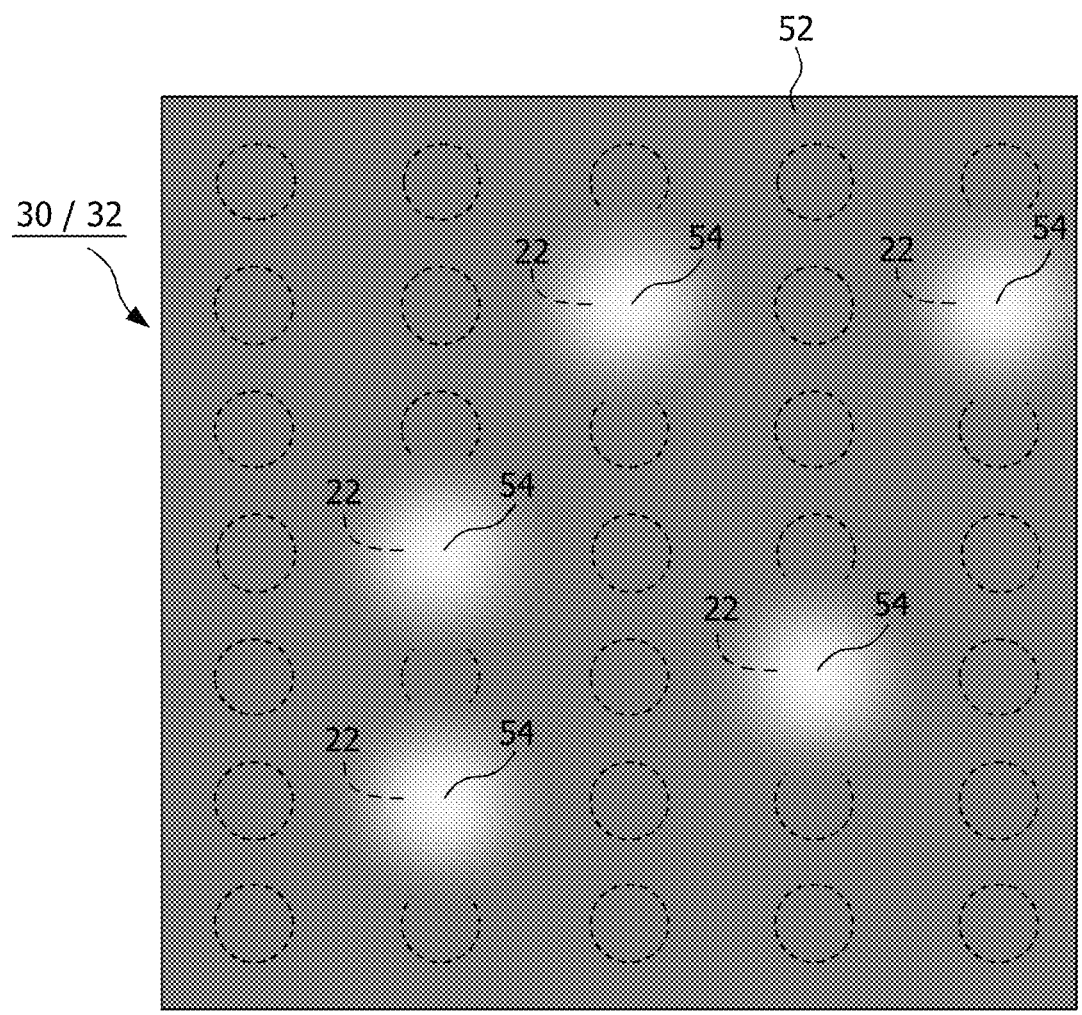
FIG. 2 shows a top view of a remote phosphor layer and/or scattering layer according to the invention.

FIG. 2 shows a top view of a remote phosphor layer 30 and/or scattering layer 32 according to the invention. For reference purposes, the location of the light sources in the array of light sources 20 is indicated with dashed lines and the location of the at least one light source 22 having a light emission characteristic which deviates from the remainder of the array of light sources 20 is also indicated. As can be seen, the luminescent material 52, 54 and/or scattering structures 52 and/or scattering material 52 vary across the remote phosphor layer 30 and/or scattering layer 32 to at least partially compensate for differences in the light emission characteristic. These variations are again indicated by varying shades of grey for clarity. The variations may, however, include also color variations. The variations shown in FIG. 2 may be density variations as shown in FIG. 1A or thickness variations as shown in FIG. 1C or a combination of the two.

Figure 3:
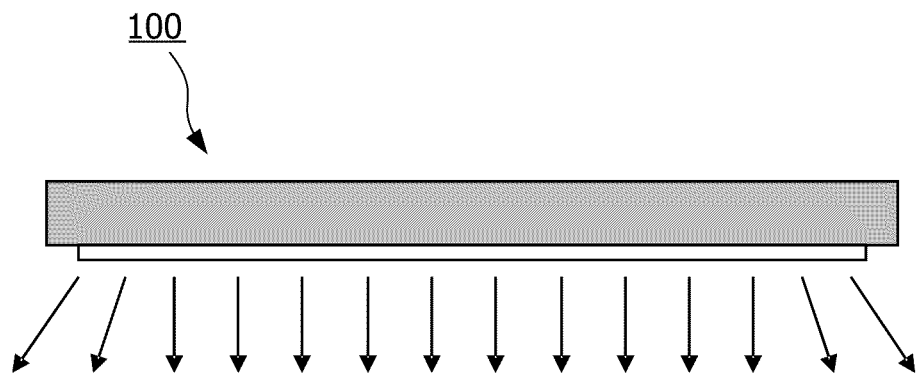
FIG. 3 shows a luminaire comprising the illumination system according to the invention.

FIG. 3 shows a schematic representation of a luminaire 100 comprising the illumination system 10, 12 according to the invention. A luminaire 100 is a complete lighting unit, for example, used in offices, shops, at home, or, for example, used as lighting unit for street-lights. The color rendering index should preferably be as high as possible such that the illumination of an object (not shown) by the luminaire 100 results in a true reproduction of the color of the object. This high color rendering index can be obtained by using, for example, a broad mixture of different luminescent materials 52, 54, together emitting light substantially covering the full visible electro-magnetic spectrum.

Figure 4:
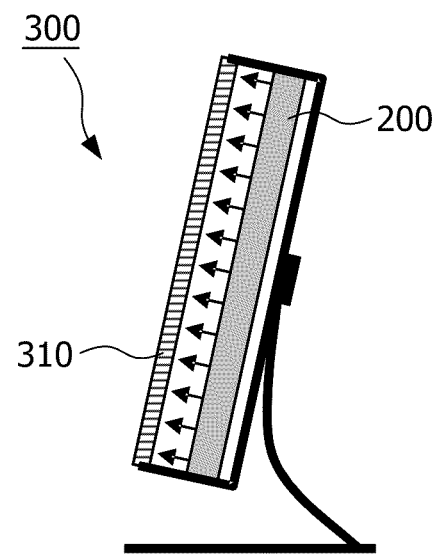
FIG. 4 shows a schematic cross-sectional view of a display device according to the invention comprising the illumination system as backlighting unit.

FIG. 4 shows a schematic representation of display device 300 comprising the illumination system 10, 12 according to the invention. The display device 300 typically comprises a non-emissive display 310, such as an array of liquid crystal cells which, by varying the transmission of cells in the array of liquid crystal cells is able to create an image on the display 300. The illumination system 10, 12 is part of a backlighting unit 200.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination system comprising:
an array of light sources and a remote phosphor layer and scattering layer arranged between the array of light sources and a light output window for emitting the light from the light sources, wherein a majority of the array of light sources are made to and include a first standard comprising a first light emission characteristic,
at least one light source of the array of light sources comprising a light emission characteristic different from the majority of the array of light sources with the first light emission characteristic,
the remote phosphor layer and scattering layer being arranged at a distance from the array of light sources, the remote phosphor layer comprising luminescent material arranged for converting at least a part of the light emitted by the light sources into light of a different color, the scattering layer comprising scattering structures and/or scattering material arranged for scattering at least a part of the light emitted by the light sources, the luminescent material being distributed across the remote phosphor layer and the scattering structures and/or scattering material being distributed across the scattering layer in a different manner directly between the at least one light source and the light output window as compared to between the majority of the array of light sources with the first light emission characteristic and the light output window based on a determination of a distribution of the luminescent material and the scattering structures and/or scattering material required for compensating at least partially the difference in light emission characteristic of the at least one light source.

2. Illumination system as claimed in claim 1, wherein the light emission characteristic is selected from the group consisting of: light intensity, light color, and angular emission profile.

3. Illumination system as claimed in claim 1, wherein the distribution of the luminescent material comprises local variations of the luminescent material for at least partially compensating the difference in light emission characteristic, and/or wherein the distribution of the scattering structures and/or scattering material comprises local variations for at least partially compensating the difference in light emission characteristic, the local variations comprising any of:
varying a density of the luminescent material across the remote phosphor layer, and/or varying a density of the scattering structures and/or scattering material across the scattering layer,
varying a thickness of the luminescent material across the remote phosphor layer, and/or varying a thickness of the scattering structures and/or scattering material across the scattering layer,
varying a mixture of different phosphor materials and/or scattering material in the luminescent material across the remote phosphor layer, the luminescent material comprising a mixture of different phosphor materials and/or scattering material, each specific phosphor material absorbing a specific part of the light emitted by the light sources and emitting light of a specific color, varying scattering and/or reflection properties across the remote phosphor layer for altering a length of an optical path through the remote phosphor layer.

4. Illumination system as claimed in claim 1, wherein a combination of the array of light sources and the remote phosphor layer and scattering layer are configured for generating a substantially uniform light distribution across the light output window.

5. Illumination system as claimed in claim 4, wherein the remote phosphor layer and/or the scattering layer are movable inside the illumination system for optimizing the uniformity of the light distribution across the light output window.

6. Illumination system as claimed in claim 1, wherein the illumination system further comprises a plurality of remote phosphor layers, each arranged between the array of light sources and the light output window, each remote phosphor layer comprising a specific luminescent material for absorbing a specific part of the light emitted by the light sources and emitting light of a specific color.

7. Illumination system as claimed in claim 6, wherein the plurality of remote phosphor layers are applied on a single carrier material.

8. Illumination system as claimed in claim 1, wherein the luminescent material is a printable luminescent material for generating the distribution across the remote phosphor layer via a printing process, and/or wherein the scattering material is a printable scattering material for generating the distribution across the scattering layer via the printing process.

9. Illumination system as claimed in claim 1, wherein the array of light sources comprises an array of light emitting diodes.

10. Illumination system as claimed in claim 1, wherein the light sources in the array of light sources emit light having a central wavelength in a range between 400 nanometers and 490 nanometers.

11. Method of at least partially correcting a light emission characteristic of at least one light source in an illumination system, the illumination system comprising an array of light sources and a remote phosphor layer and/or a scattering layer comprising scattering structures and/or scattering material arranged between the array of light sources and a light output window for emitting the light from the light sources, wherein a majority of the array of light sources are made to and include a first standard comprising a first light emission characteristic and the at least one light source comprising a light emission characteristic different from the a majority of the array of light sources with the first light emission characteristic, wherein the method comprises a step of:

determining a variation of the emission characteristic across the light output window of the illumination system before applying the remote phosphor layer and/or scattering layer, determining a distribution of the luminescent material and/or scattering structures and/or scattering material required for compensating the difference in light emission characteristic of the at least one light source, applying the luminescent material according to the determined distribution for generating the remote phosphor layer for compensating at least partially the difference in light emission characteristic, and/or applying the scattering structures and/or scattering material according to the determined distribution for generating the scattering layer for compensating at least partially the difference in light emission characteristic, wherein the steps of applying comprise distributing the luminescent material across the remote phosphor layer and the scattering structures and/or scattering material across the scattering layer in a different manner directly between the at least one light source and the light output window as compared to between the majority of the array of light sources with the first light emission characteristic and the light output window, and applying the remote phosphor layer and/or the scattering layer to the illumination system.

12. Illumination system as claimed in claim 1, wherein the scattering layer further comprises a scattering material.

13. Illumination system as claimed in claim 12, wherein the scattering material is a printable scattering material for generating the distribution across the scattering layer via the printing process.

14. Illumination system as claimed in claim 1, wherein the scattering structures comprise structures selected from the group consisting of scratches, indentations, and dots.

15. The method of claim 11, wherein the scattering layer further comprises a scattering material.

* * * * *